Aug. 26, 1969  L. FIELD  3,463,501

VEHICLE BODY SECURING MEANS

Filed Aug. 21, 1967

INVENTOR
LOUIS FIELD

BY Seidel & Gonda

ATTORNEYS.

United States Patent Office 3,463,501
Patented Aug. 26, 1969

3,463,501
VEHICLE BODY SECURING MEANS
Louis Field, c/o Allied Tank Truck Equipment Company, 24th and Brown Sts., Philadelphia, Pa. 19130
Filed Aug. 21, 1967, Ser. No. 662,181
Int. Cl. B60p *3/22;* B62d *23/00*
U.S. Cl. 280—5     10 Claims

ABSTRACT OF THE DISCLOSURE

A vehicle construction wherein a body is coupled to a vehicle chassis by a rearwardly located transverse pivot, and by pairs of downwardly and rearwardly extending swivel bars coupled to the body and the chassis forwardly of the pivot.

---

This invention relates to vehicle constructions, and more particularly, to vehicle constructions especially suitable for use in connection with tank truck bodies.

In large vehicles, wracking and bending of the chassis or frame due to twists, turns, dips, holes or other irregularities in the road surface present a considerable problem in regard to mounting of the body. Any perceptible deformation of the chassis results in quite considerable relative movement between the chassis and a body supported thereon. Such movements, if transmitted to the body, result in stress, strain and fatigue on the body, and are known to considerably shorten its useful life. The problem is particularly acute in the case of tank truck bodies, wherein even slight deformation of the body is likely to cause leakage.

The vehicle construction of the present invention is intended to permit the chassis of the vehicle to flex beneath the body without transmitting substantial forces or bending moments to the body. In a preferred embodiment, the body is pivoted to the chassis by means of a rearwardly placed transverse pivot. Swivel bars are provided on opposite sides of the body and pivotably secured to the body and the chassis. Swivel bars preferably extend at an angle of about 45° to the horizontal and generally downwardly and rearwardly. Buffers, which may take the form of elongated wooden sills, may be disposed between the body and the chassis to absorb shock and prevent direct metal-to-metal contact between the chassis and the body.

Accordingly, it is an object of this invention to provide a novel vehicle construction wherein transmission of stresses, strains and moments from the chassis to a body secured thereto is minimized.

It is another object of this invention to provide a novel means for securing a body to the chassis of a vehicle.

It is still another object of this invention to provide a simple means for securing a body to the chassis of a vehicle whereby the body is not subjected to large stresses, strains and moments due to irregularities in the roadway.

It is still another object of this invention to provide a means for securing a body to the chassis of a vehicle especially suited to use with tank type bodies.

For the purpose of illustrating the invention, there is shown in the drawings a form which is presently preferred; it being understood, however, that this invention is not limited to the precise arrangements and instrumentalities shown.

Figure 1:
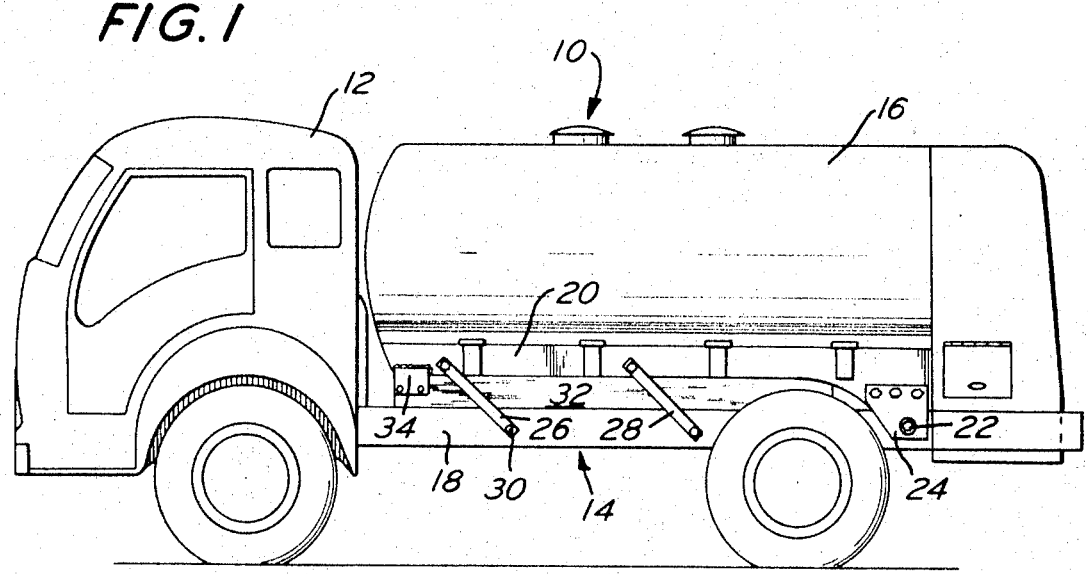
FIGURE 1 is an elevation view of a vehicle incorporating the present invention.

Referring now to the drawings in detail, wherein like numerals indicate like elements, there is seen in FIGURE 1 a vehicle designated generally by the reference numeral 10. The vehicle 10 includes a cab 12, a chassis designated generally by the reference numeral 14, and a tank type body designated generally by the reference numeral 16. It should be understood that the tank type body 16 shown in the drawings is merely illustrative, and that the present invention can be practiced with bodies of any known type. The invention is especially advantageous, however, in vehicles having tank type bodies.

Figure 2:
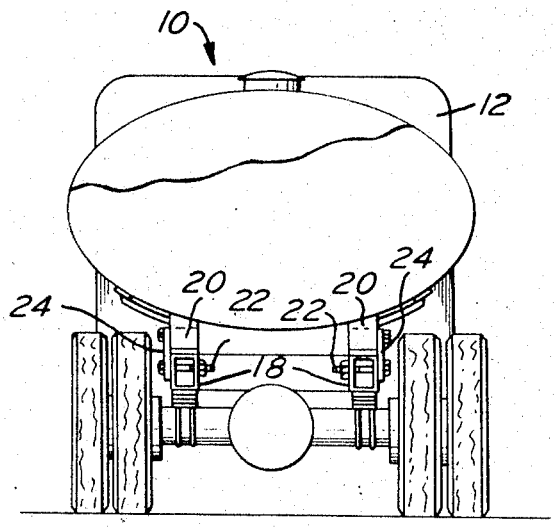
FIGURE 2 is a rear elevation view of the vehicle shown in FIGURE 1, partially broken away for clarity.

Referring to FIGURE 2, the chassis 14 is shown, for the purpose of example, to include longitudinal side rails 18. Also by way of illustration, the body 16 includes depending longitudinally extending beams 20, spaced apart by a distance corresponding generally to the spacing of the longitudinal side rails 18. A pivot joins the rearward portions of the body 16 and the chassis 14. The pivot may take the form of aligned bolts 22 extending through the longitudinal side rails 18 to define a horizontal pivot axis. The bolts 22 may also extend through depending plates 24, provided for this purpose, and joined to the beams 20 by bolts, welding or the like.

The forward ends of the body 16 and chassis 14 are jointed by spaced, longitudinally aligned pairs of swivel bars 26 and 28, the individual members of each pair being located on opposite sides of the chassis 14. The swivel bars 26 and 28 are pivotably coupled at their respective opposite ends to the body 16 and chassis 14. For example, their ends may be coupled to the side rails 18 of the chassis 14 and longitudinally extending beams 20 of the body 16 by means of bolts 30 or the like. Buffer elements, which may take the form of oak sills 32 disposed between the side rails 18 and the beams 20 provide a cushioning effect between the chassis and the body and minimize wear on the chassis and body. The sills 32 are preferably secured to one or the other of the beams 20 and rails 18 in order to maintain the sills in proper position. The illustrated embodiment, as is seen in FIGURE 1, includes plates 34 secured to the beams 20 for this purpose.

In view of the foregoing description, the manner in which the present apparatus accomplishes its objects should now be apparent. Thus, in the case of torsional deflection of the chassis 14, differential movement of the swivel bars 28 on opposite sides of the vehicle substantially isolates the strains and stresses of the chassis from the body 16. Should the chassis 14 bend to give to the longitudinal side rails 18 a "sway-back" or "humpback" profile, rotation of the swivel bars 26 and 28 about their respective pivots will cause slight rotation of the body 16 about the bolts 22. By their very nature, the pivotable connections between the swivel bars 26 and 28 can transmit substantial forces only in directions on a line between their respective pivots. Thus, large magnitude tension and shear forces which would be applied to the body 16 if it were rigidly coupled to the chassis are eliminated.

It will be noted from FIGURE 1 that the swivel bars 28 and 30 are angled generally downwardly and rearwardly, at an angle of about 45°. With the swivel bars at such an angle, there is a highly desirable tendency for the body 16 to rotate about the bolt 22 into tighter engagement with the chassis 14 upon application of the brakes of the vehicle 10. Such tendency prevents uncontrolled and violent impact between the body 16 and chassis 14 as a result of forces due to deceleration.

Although FIGURE 1 illustrates two pairs of swivel bars on each side of the vehicle, a single pair may be utilized. In this regard, it has been found that a single pair approximately 1 to 4 feet back from the front of the body is suitable. The dimensions of the swivel bars 26, 28 and the plates 24, and the materials to be used for these elements, are matters which will be evident to those skilled in the art. Steel, aluminum or even plastic polymeric materials of suitable thickness have been found adequate for the plates 24. In one embodiment of the invention, steel bars 3 inches wide by 18 inches long and one-half inch thick were found to be adequate.

The present invention may be embodied in other specific forms without departing from the spirit or essential attributes thereof.

I claim:

1. In a vehicle having a chassis and a body portion, means for securing said body portion to said chassis, said securing means comprising pivot means extending transversely of said chassis and pivotably coupling the body portion to said chassis, said pivot means being disposed adjacent the rear of said body portion and said chassis, and longitudinally aligned swivel bars disposed on opposite sides of said vehicle forwardly of said pivot means for coupling the forward end of the body portion to the chassis, said swivel bars being pivotably coupled at their opposite ends to said chassis and said body portion and extending downwardly and rearwardly with respect to said body portion to normally maintain the forward end of the body portion in overlying, weight transmitting relation with respect to the chassis.

2. In a vehicle in accordance with claim 1, said swivel bars extending downwardly and rearwardly at an angle of about 45 degrees to the horizontal.

3. In a vehicle in accordance with claim 1, wherein said body portion includes a pair of longitudinally extending depending beams, said swivel bars being coupled at their respective upper ends to said beams.

4. In a vehicle in accordance with claim 3, buffer elements between said beams and said chassis for transmitting force from said beams to said chassis.

5. In a vehicle in accordance with claim 4, said buffer elements being elongated wooden sills extending longitudinally of said vehicle in contact with said beams.

6. A vehicle comprising a chassis, a body portion and means for securing said body portion to said chassis, said means for securing said body portion to said chassis comprising pivot means extending transversely of said chassis and pivotably coupling said body portion to said chassis, said pivot means being disposed adjacent the rear of said body portion and said chassis, and longitudinally aligned swivel bars disposed on opposite sides of said vehicle forwardly of said pivot means for coupling the forward end of the body portion to the chassis, said swivel bars being pivotably coupled at opposite ends to said chassis and said body portion and extending downwardly and rearwardly with respect to said chassis and the body portion to normally maintain the forward end of the body portion in overlying, weight transmitting relation with respect to the chassis.

7. A vehicle in accordance with claim 6, and buffer elements between said body portion and said chassis for transmitting force from said body portion to said chassis.

8. A vehicle in accordance with claim 7 wherein said body portion comprises a tank truck body.

9. In a vehicle having a chassis and a body portion, means for securing said body portion to said chassis, said securing means comprising pivot means extending transversely of said chassis and pivotably coupling said body portion to said chassis, said pivot means being disposed adjacent the rear of said body portion and said chassis, and a plurality of swivel bars disposed on opposite sides of said vehicle forwardly of said pivot means, bars on opposite sides of said vehicle being in longitudinal alignment, said swivel bars being pivotably coupled at their opposite ends to said chassis and said body portion and extending downwardly and rearwardly with respect to said body portion.

10. In a vehicle in accorance with claim 9, said body portion including a pair of longitudinally extending depending beams, said swivel bars being coupled at their respective upper ends to said beams, elongated wooden sills extending longitudinally of said vehicle between said beams and said chassis for transmitting force from said beams to said chassis, and said swivel bars extending downwardly and rearwardly at an angle of about 45 degrees to the horizontal.

References Cited

UNITED STATES PATENTS 2,556,610   6/1951   Biszantz.

FOREIGN PATENTS 946,330   7/1956   Germany.
801,630   9/1958   Great Britain.

LEO FRIAGLIA, Primary Examiner

U.S. Cl. X.R.

296—35